Jan. 4, 1955  W. BAUERSFELD  2,698,554
SLIDING STAGE FOR MICROSCOPES
Filed June 21, 1950
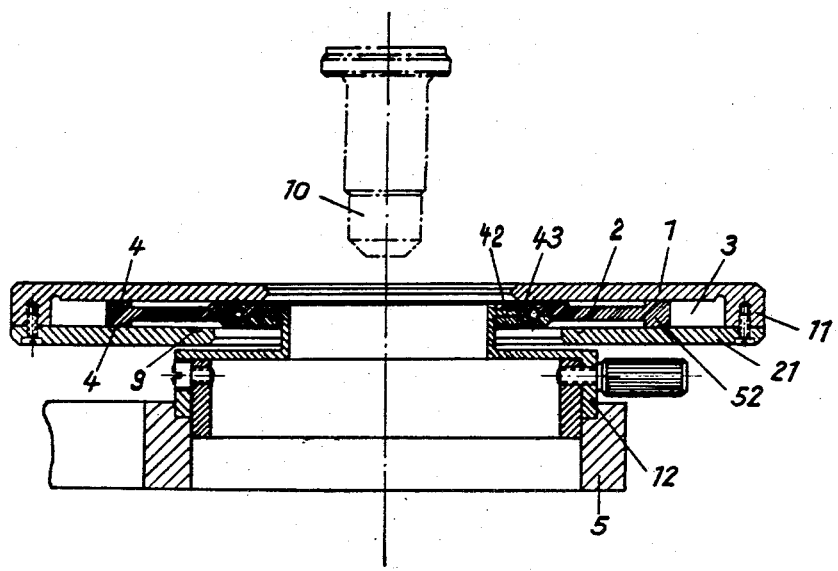

United States Patent Office 2,698,554
Patented Jan. 4, 1955

2,698,554

SLIDING STAGE FOR MICROSCOPES

Walther Bauersfeld, Heidenheim on the Brenz, Germany, assignor to Carl Zeiss, Heidenheim, Germany Application June 21, 1950, Serial No. 169,309

Claims priority, application Germany June 28, 1949

4 Claims. (Cl. 88—40)

Microscope stages are known in the form of sliding stages, in which the movable stage plate is mounted slidably upon a supporting body with the interposition of a viscous layer, e. g. "vaseline." They make possible a microscopically minute displacement of an object mounted upon the stage plate solely through the pressure of the hand since the internal friction of the intermediate layer opposes a considerable resistance to the movement of the stage plate and the plate thus upon cessation of the pressure remains stationary exactly in the occupied position without after effect. Compared to the customary microscope stages, in which the movement results from mechanical transmission gears, the sliding stages have the advantage of a simpler constructibility.

Further there have become known stages for microscopes comprising a stage plate supported on a supporting body and having spring-leaf-shaped flanges attached to the underside of the stage plate contacting with the underside of said supporting body for pressing the said stage without an intermediary lubricant to said body with a force just sufficient to prevent the former from slipping when the microscope is inclined at an angle. Also distributor plates have become known with the plate rotatably supported on a supporting body by ball bearings which plates are equipped with an annular shaped flange clasping the said supporting body at its underside with sufficient spacing in order to prevent the rotary distributor plate resting on its supporting body to be lifted from the latter.

The subject matter of the present invention is an improvement of a sliding stage for microscopes having a stage plate slidably mounted with respect to and in contact with a supporting body, in which also a layer of viscous material is interposed in well known manner between said plate and said supporting body which is of disc-shaped form and possesses an outer rim somewhat smaller in diameter than the rim of said stage plate. The improvement consists in that the stage plate has the form of a hollow annular casing, the inner hollow space of said plate receiving said disc-shaped supporting body in such a manner that both the upper and lower inner surfaces of said hollow casing, upon interposition of said viscous layer, is in slidable contact with the corresponding surfaces of said supporting body. Thus the slideable stage plate embraces the disc or annulus shaped supporting body about the outer rim. Thereby results the advantage that the under side of the stage plate, which is coated with "vaseline" or some other viscous mass, is protected against being touched. Moreover this embracing of the supporting body prevents an unintentional lifting off of the plate from this body during microscopy.

According to a preferred form of construction of the invention the said supporting body is thickened at least at its outer rim to form ringshaped contact surfaces, the latter including between themselves and the said rim of said stage plate hollow spaces filled with sufficient supply of said viscous material. Hereby not only the danger of even the slightest lifting of the stage plate from the supporting body is completely avoided, but as a consequence the sliding surfaces of the supporting body, with which this lies against the stage plate, can be considerably reduced. Thereby if necessary the degree of inner friction during mutual displacement can be so selected that indeed microscopically small displacements of the stage are possible without that the frictional resistance becomes too great and makes difficult certain working with the arrangement.

Further details of the invention ensue from an exemplary construction, attention being drawn to the following description and to the drawing.

The figure shows schematically a simple example of construction in sectional elevation.

The object guide for microscopes consists essentially of two plates 1 and 2 e. g. of metal, of which plate 1 serves as the movable stage plate and plate 2 as supporting body. Both plates, whose surfaces of contact are well polished, are pressed upon one another with an intermediate thin layer 4 of viscous substance, e. g. "vaseline" or the like, and then are mutually displaceable with relatively slight friction. Plate 2 is connected to a ring shaped metal piece 12, which can be inserted into a tubular receptacle 5 of the microscope stand. The outer rim of plate 1 is formed as a ring body 11. This carries on the lower side an annular abutment member 21 which closes off the stage plate 1 from below. The abutment member 21 is so dimmensioned that the stage plate in none of its positions can be lifted from the supporting body 2.

During microscopy the stage plate 1, 11 is displaced in any desired direction by suitable pressure of the hand, so that for example the total surface of the object to be mounted on the stage 1 can gradually be brought into the field of view of the microscope objective 10.

The annulus 2 is mounted easily rotatable on tube 12 in that an annular rib 42 of the tube 12 is slidably clamped between the supporting body 2 and a clamping ring 43 screwed to said body 2. By the annular abutment member 21 which is screwed against the stage plate 1 from below there is formed a hollow annular casing which practically completely encloses the supporting body 2. The ring shaped supporting body 2 is thickened at the outer rim, at 52, and carries there on both sides ground faces against which lie with the intermediation of a "vaseline" layer the stage plate 1 and the abutment member 21, likewise with ground faces. The hollow space 3 lying between the outer part 11 and supporting body part 52 is about two thirds filled with the employed viscous material (e. g. "vaseline"), so that there is always present a sufficient supply, also in prolonged use of the arrangement and moreover, by moving the table a steady flow of the viscous material is effected to and fro in the shut-up hollow space in pump-like manner, thus effecting good lubricant transport to the gliding portions. Superfluous grease is caught in the ring groove 9 of abutment member 21.

The stage plate 1 can thus be displaced with sufficient resistance in all directions lying within the stage plane through simple pressure of the hand. Thereby easy rotatability is assured through the special rotation mounting of the supporting disc 2 at 42.

I claim:
1. Sliding stage for microscopes comprising a displaceable stage plate and a supporting body therefor, said stage plate being of disc-shaped form and having attached thereto and spaced therefrom an annular abutment member such as to form with said plate a hollow annular casing, said supporting body being likewise of disc-shaped form and having its outer rim somewhat smaller in diameter than the rim of said stage plate, the inner hollow space of said stage plate casing receiving said disc-shaped supporting body, and a layer of viscous material interposed between the upper and lower inner surfaces of said hollow casing and of said supporting body respectively, thus effecting a good sliding contact between the corresponding surfaces of said stage plate and said supporting body.

2. Sliding stage for microscopes comprising a displaceable stage plate and a supporting body therefor, said stage plate being of disc-shaped form and having attached thereto and spaced therefrom an annular abutment member such as to form with said stage plate a hollow annular casing, said supporting body being likewise of disc-shaped form and having its outer rim somewhat smaller in diameter than the rim of said stage plate, the inner hollow space of said stage plate casing receiving said dis-shaped supporting body, the said outer rim of said supporting body extending on both sides so as to form guide ridges contacting both the said stage plate and said abutment member, a layer of viscous material interposed between the said contacting surfaces thus effecting a good sliding contact between said guide ridge surfaces of said supporting body and said stage plate casing surfaces.

3. Sliding stage for microscopes comprising a displaceable stage plate and a supporting body therefor, said stage plate being of disc-shaped form and having attached thereto and spaced therefrom an annular abutment member such as to form with said plate a hollow annular casing, said supporting body being likewise of disc-shaped form and having its outer rim somewhat smaller in diameter than the rim of said stage plate, the inner hollow space of said stage plate casing receiving said disc-shaped supporting body, the said outer rim of said supporting body extending on both sides so as to form guide ridges contacting both the said stage plate and said abutment member, a layer of viscous material interposed between the said contacting surfaces thus effecting a good sliding contact between said guide ridges of said supporting body and the contacting surfaces of said stage plate casing, said annular abutment member being attached to the said rim of said stage plate, the said stage plate casing embracing the said outer rim of said supporting member such as to form a hollow space, said space being filled with a sufficient quantity of said viscous material.

4. Sliding stage for microscopes comprising a displaceable stage plate and a supporting body therefor, said stage plate being of disc-shaped form and having attached thereto and spaced therefrom an annular abutment member such as to form with said plate a hollow annular casing, said supporting body being likewise of disc-shaped form and having its outer rim somewhat smaller in diameter than the rim of said stage plate, the inner hollow space of said stage plate casing receiving said disc-shaped supporting body, and a layer of viscous material interposed between the upper and lower inner surfaces of said hollow casing and of said supporting body respectively, thus effecting a good sliding contact between the corresponding surfaces of said stage plate and said supporting body, said annular abutment member having an annular groove at its inner contacting surface for receiving superfluity of said viscous material.

References Cited in the file of this patent

UNITED STATES PATENTS

| | | |
|---|---|---|
| 198,607 | Gundlach | Dec. 25, 1877 |
| 2,070,037 | Bauersfeld | Feb. 9, 1937 |

FOREIGN PATENTS

| | | |
|---|---|---|
| 579,789 | Germany | June 30, 1933 |
| 138,913 | Austria | Oct. 10, 1934 |